United States Patent
Olver et al.

(10) Patent No.: US 9,784,132 B2
(45) Date of Patent: Oct. 10, 2017

(54) VOLTAGE DISCHARGE CHANNELLING ASSEMBLY FOR A GAS TURBINE ENGINE

(71) Applicant: PRATT & WHITNEY CANADA CORP., Longueuil (CA)

(72) Inventors: Bryan William Olver, Nobleton (CA); Suresh Sivavarman, Brampton (CA); Brant Duke, LaSalle (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 248 days.

(21) Appl. No.: 14/690,736

(22) Filed: Apr. 20, 2015

(65) Prior Publication Data

US 2016/0305330 A1     Oct. 20, 2016

(51) Int. Cl.
*H05F 3/00*    (2006.01)
*F01D 25/24*   (2006.01)

(52) U.S. Cl.
CPC ...... *F01D 25/243* (2013.01); *F05D 2300/224* (2013.01); *F05D 2300/50* (2013.01); *F05D 2300/603* (2013.01); *F05D 2300/614* (2013.01)

(58) Field of Classification Search
CPC ....................................................... F01D 25/24
USPC ......................................................... 361/216
See application file for complete search history.

(56) References Cited

U.S. PATENT DOCUMENTS

| | | | |
|---|---|---|---|
| 3,755,713 A | 8/1973 | Paszkowski | |
| 4,920,449 A * | 4/1990 | Covey | H05F 3/02 244/1 A |
| 5,175,665 A | 12/1992 | Pegg | |
| 5,226,789 A * | 7/1993 | Donges | F01D 9/042 415/173.4 |
| 6,848,885 B1 * | 2/2005 | Maclean | F01D 25/24 415/115 |
| 7,307,825 B2 | 12/2007 | De La Fuente De Ana et al. | |
| 7,898,785 B2 | 3/2011 | Winter et al. | |
| 8,634,177 B2 | 1/2014 | Kawahara et al. | |
| 8,791,375 B2 | 7/2014 | Fisher et al. | |
| 8,918,993 B2 | 12/2014 | Braden et al. | |
| 9,204,497 B2 | 12/2015 | Willmot et al. | |
| 2009/0162139 A1 | 6/2009 | Miller et al. | |
| 2012/0076647 A1 * | 3/2012 | Robertson, Jr. | F01D 21/045 415/182.1 |
| 2012/0145825 A1 | 6/2012 | Granado Macarrilla et al. | |

* cited by examiner

*Primary Examiner* — Stephen W Jackson (74) *Attorney, Agent, or Firm* — Norton Rose Fulbright Canada LLP (57) ABSTRACT

A gas turbine engine including a composite case having a conductive path therein, and a conductive case connected to the composite case. The conductive case is made of a conductive material. A fastener connects the composite case to the conductive case. The fastener is conductively connected to the conductive material of the conductive case and not directly conductively connected to the conductive path. At least one voltage discharge channeling assembly is connected to the fastener and to the conductive case. The at least one voltage discharge channeling assembly has a portion conductively connected to the conductive path. The at least one voltage discharge channeling assembly is conductively connected to the fastener. A method of assembling an engine casing in a gas turbine engine is also provided.

16 Claims, 7 Drawing Sheets

VOLTAGE DISCHARGE CHANNELLING ASSEMBLY FOR A GAS TURBINE ENGINE

TECHNICAL FIELD

The application relates generally to gas turbine engines and, more particularly, to voltage discharge channelling assemblies.

BACKGROUND

When lightning currents strike a carbon-composite outer bypass duct of a gas turbine engine, the electrical current may be so strong that a localised pitting occurs which can burn the resin and expose the carbon fiber normally embedded in the resin. As this is an undesirable situation, improvement is sought.

SUMMARY

In one aspect, there is provided a gas turbine engine comprising: a composite case having a conductive path therein; and a conductive case connected to the composite case, the conductive case being made of a conductive material; a fastener connecting the composite case to the conductive case, the fastener being conductively connected to the conductive material of the conductive case and not directly conductively connected to the conductive path; and at least one voltage discharge channeling assembly connected to the fastener and to the conductive case, the at least one voltage discharge channeling assembly having a portion conductively connected to the conductive path, the at least one voltage discharge channeling assembly being conductively connected to the fastener.

In another aspect, there is provided a method of assembling an engine casing in a gas turbine engine, the method comprising: inserting a portion of a voltage discharge channeling assembly into a composite case of the engine casing, the composite case having a conductive path therein, the portion of the voltage discharge channeling assembly conductively connected to conductive path; fastening the composite case to a conductive case of the engine case with a fastener in such a way that the fastener is not directly conductively connected to the conductive path; and forming a discharge path from the conductive path to the conductive case by conductively connecting another portion of the voltage discharge channeling assembly to the fastener.

DESCRIPTION OF THE DRAWINGS

Reference is now made to the accompanying figures in which.

DETAILED DESCRIPTION

Figure 1:
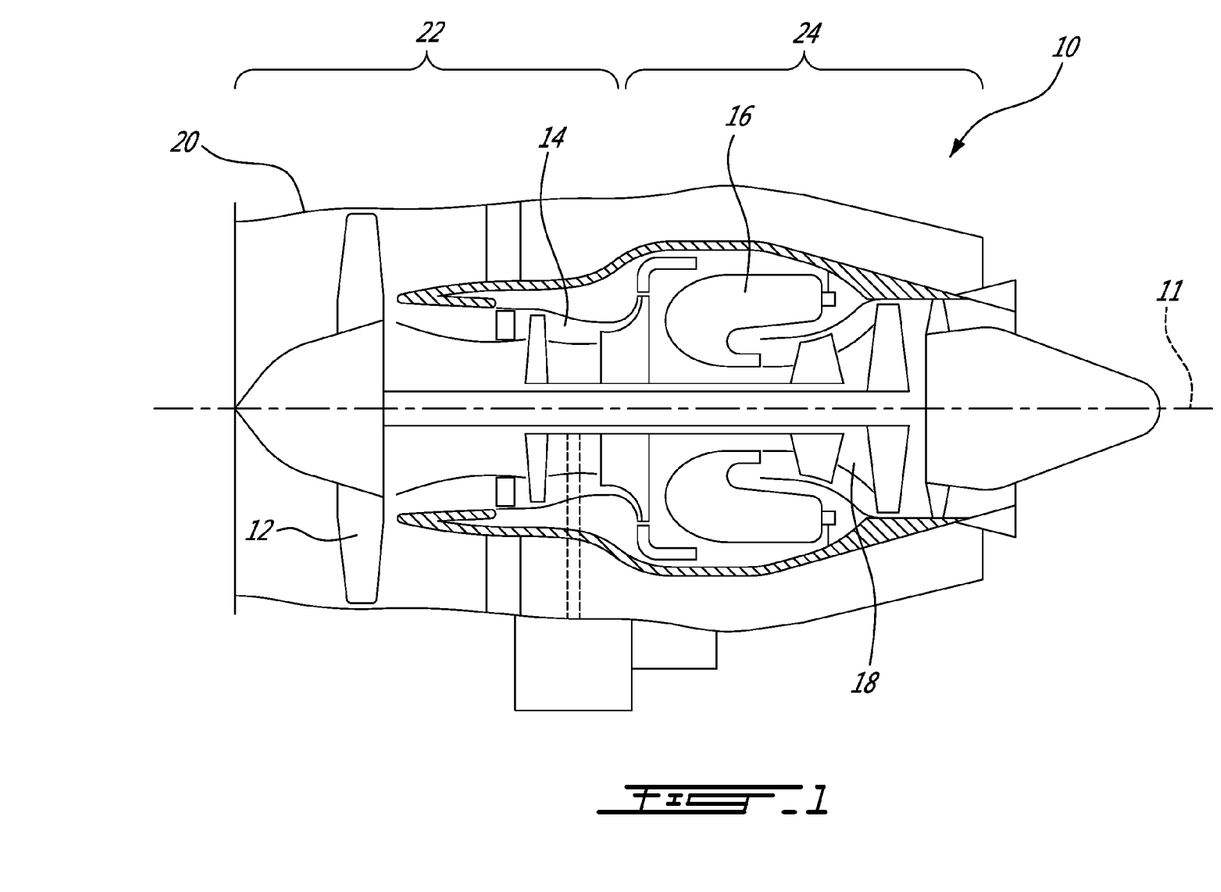
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The gas turbine engine 10 includes an annular engine casing 20 protecting internal components of the engine. The engine casing 20 includes an annular conductive case 22 made of a conductive material, typically stainless steel, connected to an annular composite case 24 made of a composite material. The composite case 24 is typically fastened to the conductive case 22. The composite material includes a discharge or conductive path 23 (illustrated schematically in phantom in FIGS. 2 and 3). In one embodiment, the conductive path 23 includes conductive fibers, such as carbon fibers. The carbon fibers may be embedded in a non-conductive resin. The carbon fibers are rather conductive of current, while the resin is rather an insulator. The composite case 24 may be covered with an outer layer of glass fiber to prevent galvanic corrosion. The composite case 24 may be made of various composite materials having conductive paths, including but not limited to the ones involving conductive fibers embedded in non-conductive materials.

Figure 2:
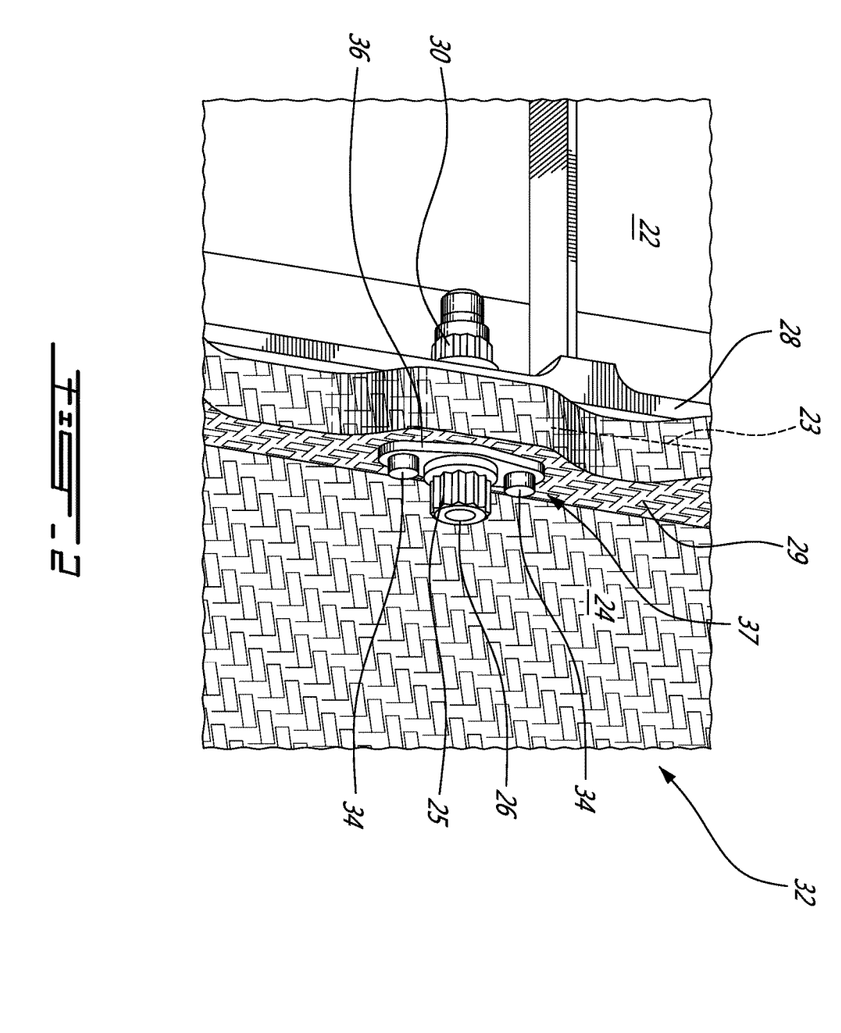
FIG. 2 is a schematic perspective view of a connection between two engine cases for a gas turbine engine such as the gas turbine engine of FIG. 1, showing a voltage discharge channelling assembly connected to a fastener.
Figure 7:
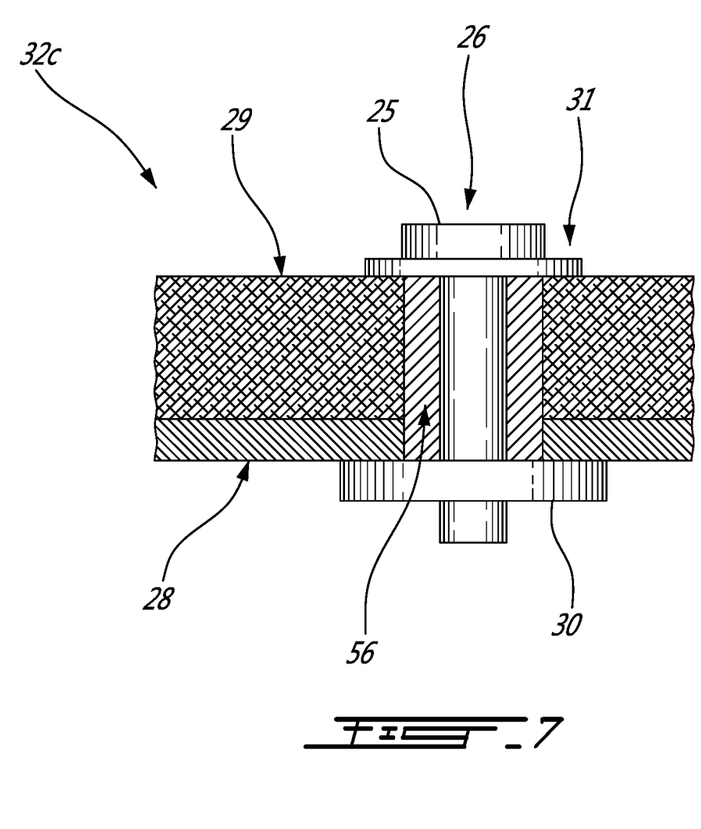
FIG. 7 is a schematic cross-sectional view of another embodiment of a voltage discharge channelling assembly and the fastener shown inserted in the engine case.

Turning to FIG. 2, in one embodiment, the conductive case 22 and the composite case 24 are fastened to each other by a plurality of reusable threaded fasteners, or bolts 26 disposed at annular flanges 28, 29 of the conductive case 22 and the composite case 24 respectively. In one embodiment, the conductive case 22 and the composite case 24 are fastened to each other by ten circumferentially equidistantly disposed bolts 26. The bolts 26 may be inserted in holes formed in the conductive case 22 and the composite case 24 and then be secured to the flanges 28, 29 by nuts 30. Washers could be disposed between the nuts 30 and the bolts 26, and/or between heads 25 of the bolts 26 and the conductive case 22 and/or composite case 24. An example of washer 31 is shown in FIG. 7 being disposed between the head 25 of the bolts 26 and the composite case 24.

The bolts 26 go through a thickness of the flanges 28, 29 of the conductive case 22 and the composite case 24. There may be a space between the bolts 26 and the hole created in the flange 29 of the composite case 24 such that the bolt may be conductively isolated from the carbon fibers of the composite case 24. The bolts 26 may be easily removed from the conductive case 22 and the composite case 24 in case of engine maintenance.

Figure 3:
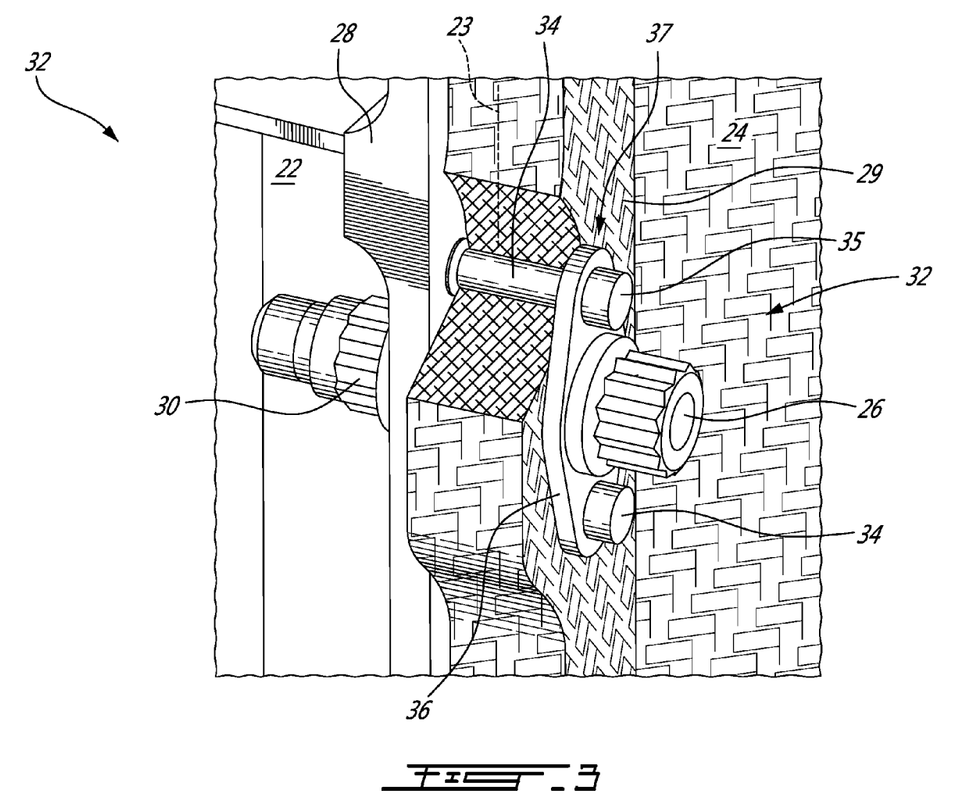
FIG. 3 is another schematic perspective view of the voltage channelling assembly and fastener of FIG. 2, with a portion of one of the engine cases cut out to reveal a portion of the voltage discharge channelling assembly.

Referring additionally to FIG. 3, the bolts 26 may also be used in a plurality of voltage discharge channeling assemblies 32. The voltage discharge channeling assemblies 32 may create a path of least resistance to be used, for example, in case of a lightning event.

When using composite structures, such as the composite case 24, fiber reinforced plastics are selected for their corrosive resistance. The use of composites that are reinforced with carbon fibers may however induce galvanic corrosion when connected to aluminum components. The voltage discharge channeling assemblies 32 are designed to penetrate the non-conductive outer layer of glass fiber, and to allow contact with the conducting carbon fibers (i.e. conductive path) while preventing the development of a galvanic corrosion cell. The voltage channelling assemblies 32 described herein may be used to connect various composite structures (not necessarily engine casing components) of the gas turbine engine to metallic structure for creating a conductive path between a composite structure and a metallic structure.

Each voltage discharge channeling assembly 32 includes at least one carbon-fiber contacting element (or end or portion) that is inserted into the composite case 24, and an associated conducting element (or end or portion) which connects the carbon-fiber contacting element to the bolt 26 and thus conductively to the conductive case 22.

Figure 4:
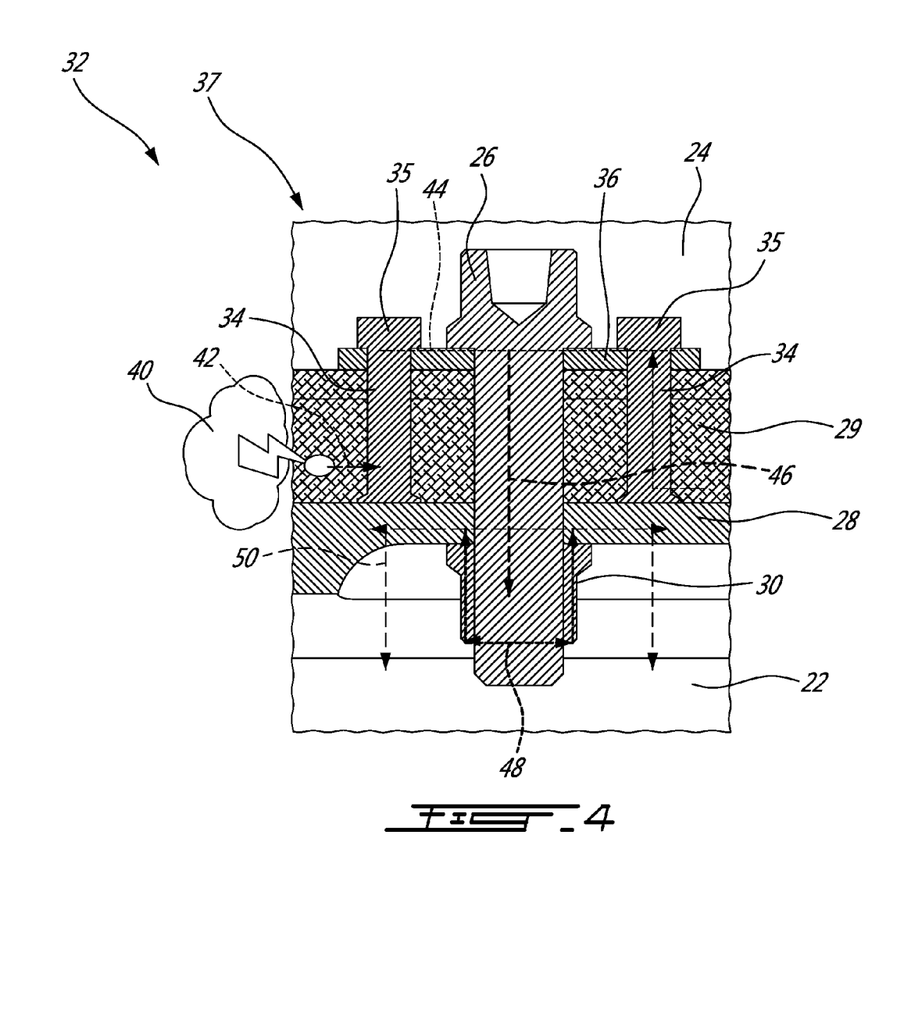
FIG. 4 is a schematic cross-sectional view of the voltage discharge channelling assembly and fastener of FIG. 2.

In the embodiment shown in FIGS. 2 to 4, two swaged rivets 34 are carbon-fiber contacting elements of the voltage discharge channeling assembly 32, and a metallic plate 36 is the associated conducting element connecting the two rivets 34 to the bolt 26. Other types of voltage discharge channeling assemblies will be described below in relation to FIGS. 5 to 7.

The rivets 34 are conductive of current and may be made of monel (nickel alloy). The swaged rivets 34 may be mechanically squeezed into a drilled hole in the flange 29 of the composite case 24 so as to ensure an interference fit with the composite case 24 to allow the rivet 34 to contact drilled edges of the carbon fibers of the composite case 24. The voltage discharge channeling assembly 32 shown in FIGS. 2 and 3 includes two rivets 34, but it is contemplated that the voltage discharge channeling assembly 32 could include only one or more than two rivets 34. The rivets 34 are shown herein to be extending through the entire thickness of the flange 29 and contacting the conductive case 22, but it is contemplated that the rivets 34 could be shorter than the thickness of the flange 29 of the composite case 24 and not be contacting the conductive case 22. It is also contemplated that the rivets 34 could contact the carbon fibers by way other than interference fit.

The plate 36 includes three apertures (not shown). Two apertures receive heads 35 of the rivets 34, and the third aperture receives the bolt 26. As a result, the plate 36 connects the rivets 34, mechanically and conductively, to the bolt 26. The plate 36 may not only be used for conducting voltage discharge between the bolt 26 and the rivets 34, but also for preventing galvanic corrosion. When the swaged rivets 34 expand in their holes, they push the rivet's head 35 and the plate 36 toward the flange 29, thus providing sealing the rivet hole via the material expansion of the riveting process. The sealed rivet hole prevents galvanic corrosion.

The rivets 34 and plate 36 provide a conductive path between the composite case 24 and the conductive case 22. The rivets 34 and plate 36 could be integrally formed together so as to form one piece. The rivets 34 and plate 36 could be replaced by other types of discharge channelling assemblies.

Turning to FIG. 4, a conductive route between the composite case 24 and the conductive case 22 in case of a lightning event will be described.

Should a lightning 40 strike the composite case 24, the outer layer of glass fiber may locally melt and expose the carbon fibers to the lightning 40. Current may then be transmitted from the lightning 40 to the composite case 24 via the conductive path 23, in this case the carbon fibers, and to the rivets 34 due to their connections to the carbon fibers (see arrow 42). The current may then flow to the plate 36 (see dotted line 44), and then from the plate 36 to the bolt 26 (see arrow 46) which is insulated from the composite case 24 but conductively connected to the conductive case 22. The bolt 26 transmits the current to the nut 30 (see arrows 48) due to their mechanical contact. The nut 30 also contacting the conductive case 22, the current is finally transmitted from the nut 30 to the conductive case 22 (see arrow 50).

The conductive route described above is bi-directional. The lightning event could occur at the conductive case 22 and travel back to the composite case 24.

Figure 5:
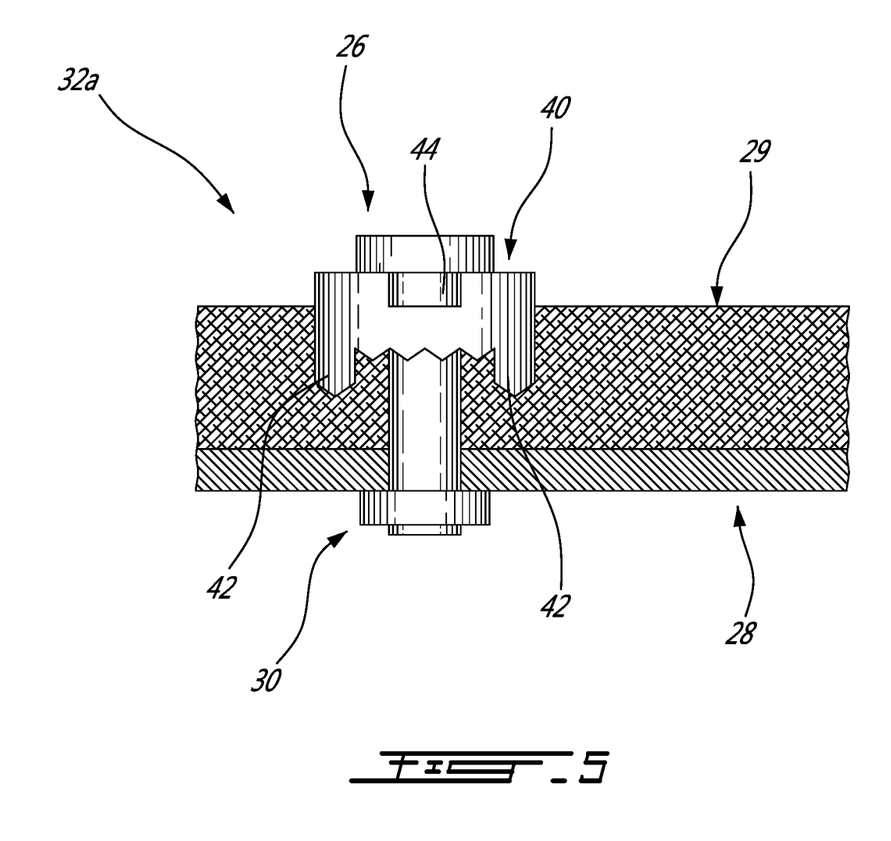
FIG. 5 is a schematic cross-sectional view of another embodiment of a voltage discharge channelling assembly and the fastener shown inserted in the engine case.
Figure 6A:
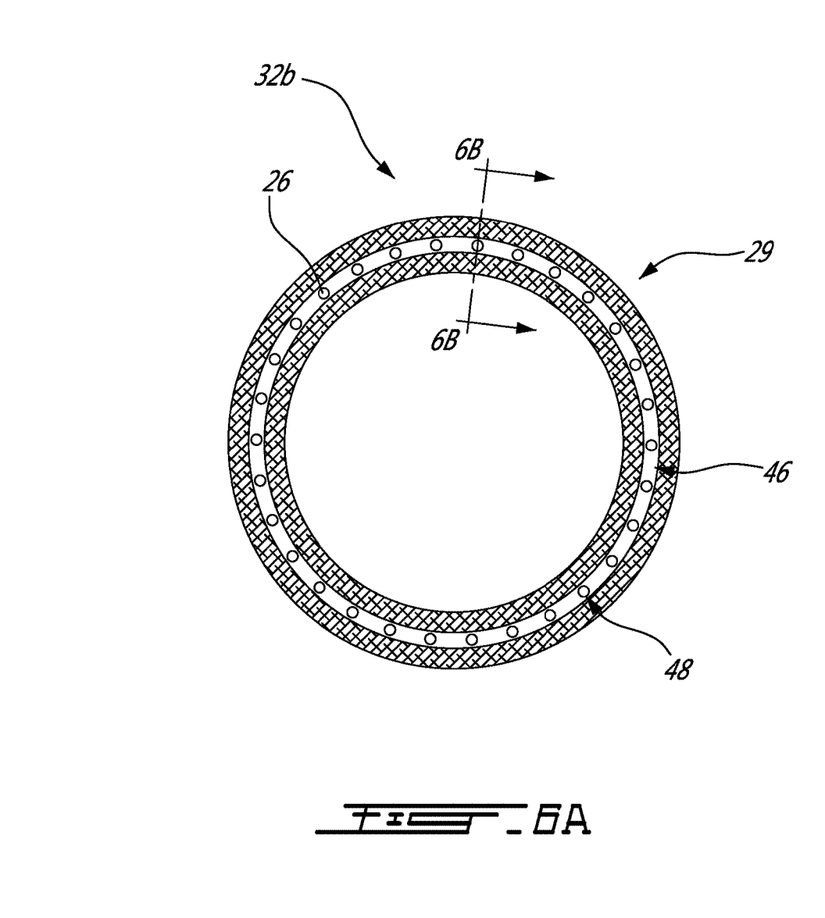
FIG. 6A is a schematic cross-sectional end view of another embodiment of a voltage discharge channelling assembly fastener shown inserted in the engine case.
Figure 6B:
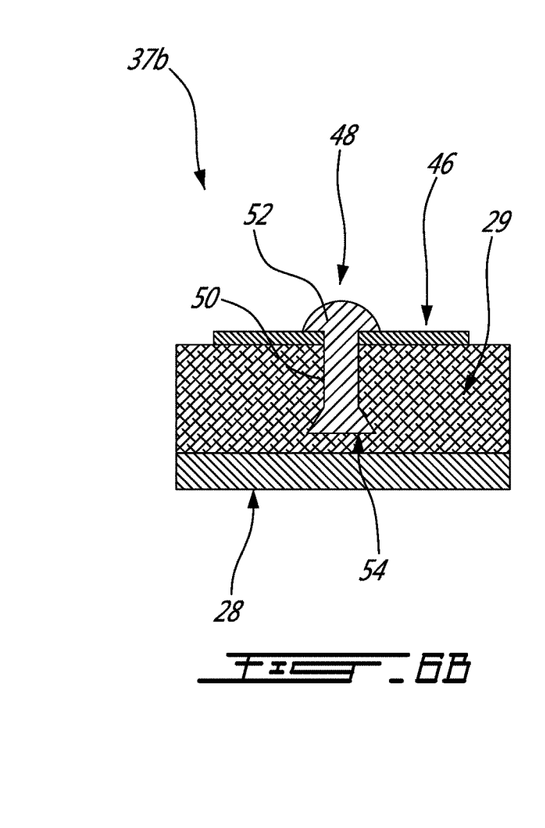
FIG. 6B is a cross-sectional view taken along line 6B-6B of the voltage discharge channelling assembly in FIG. 6A.

FIGS. 5 to 7 show some of the other types of discharge channelling assemblies that could be used in conjunction with the bolt 26.

For example, FIG. 5 shows a discharge channelling assembly 32a including a spiked washer 40. The spiked washer 40 includes spike ends 42 which are inserted into the flange 29 of the composite case 24 so as to contact with the carbon fibers. The spiked washer 40 has a central bore 44 through which the bolt 26 extends. The central bore 44 is sized so that there is conductive contact between the spiked washer 40 and the bolt 26.

In another example shown in FIGS. 6A and 6B, a discharge channelling assembly 32b includes a metallic ring 46 is fastened to the circular flange by the bolts 26 and is riveted circumferentially along the flange 29 by rivets 48, the metallic ring 46 being used instead of the plurality of plates 36. The rivets 48 have a rivet body 50 which is inserted into the flange 29. The rivet body 50 penetrates the outer layer of glass fiber to contact the carbon fibers in the flange 29 of the composite case 24. A rivet head 52 abuts the metallic ring 46 against the flange 29. The rivets 48 are conductively connected to the metallic ring 46 and the flange 29. In one embodiment, the rivets 48 are circumferentially disposed in alternating fashion with the bolts 26 along the ring 46.

In yet another example, shown in FIG. 7, a discharge channelling assembly 32c includes a metallic threaded insert 56 shaped as a sleeve snugging the bolt 26. The metallic threaded insert 56 is snug with the bolt 26 so as to conductively contact with the bolt 26. The metallic threaded insert 56 is also in conductive contact with the carbon fibers of the composite case 24.

It is also contemplated that a series of fasteners, such as self-tapping screws, could penetrate through the outer layer of glass fiber and contact the carbon fibers.

The above described voltage discharge channeling assemblies provide an electrical bond between composite materials having conductive fibers and other conductive portions of the gas turbine engine. The voltage discharge channeling assemblies may provide a corrosion protected lightning path through the engine casing. The voltage discharge channeling assemblies are associated with fastener that provide mechanical attachment between different portions of the engine casing. As such, the voltage discharge channeling assemblies use already existing mechanical attachments, and can be retrofitted. The use of the mechanical attachments in the voltage discharge channeling assemblies described above may also allow fastening and unfastening of the portions of the engine casing without altering the voltage discharge channeling assemblies or the engine casing.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A gas turbine engine comprising:
   a composite case having a conductive path therein; and
   a conductive case connected to the composite case, the conductive case being made of a conductive material;
   a least one fastener connecting the composite case to the conductive case, the at least one fastener being conductively connected to the conductive material of the conductive case and not directly conductively connected to the conductive path; and
   at least one voltage discharge channeling assembly connected to the at least one fastener and to the conductive case, the at least one voltage discharge channeling assembly having a portion conductively connected to the conductive path, the at least one voltage discharge channeling assembly being conductively connected to the at least one fastener.

2. The gas turbine engine of claim 1, wherein the at least one fastener is in loose fit connection with the composite case.

3. The gas turbine engine of claim 1, wherein the conductive path includes conductive fibers.

4. The gas turbine engine of claim 3, wherein the conductive fibers are embedded in a non-conductive resin.

5. The gas turbine engine of claim 4, wherein the conductive fibers of the composite case portion are carbon fibers.

6. The gas turbine engine of claim 1, wherein the portion conductively connected to the composite case of the at least one voltage discharge channeling assembly is in interference fit with the composite case.

7. The gas turbine engine of claim 1, wherein the at least one voltage discharge channeling assembly includes a plate connected to the at least one fastener and at least one rivet connected to the plate and to the composite case, the at least one rivet being partially inserted into in the composite case and conductively connecting the conductive path of the composite case, the plate conductively connecting the at least one rivet to the at least one fastener.

8. The gas turbine engine of claim 7, wherein the at least one rivet is a swaged rivet.

9. The gas turbine engine of claim 7, wherein the plate is a metallic ring.

10. The gas turbine engine of claim 1, wherein the at least one voltage discharge channeling assembly includes a spiked washer having spiked ends inserted into the composite case and conductively connected to the conductive path, the spiked washer having a central bore through which the at least one fastener extends, the spiked washer conductively connecting the conductive path to the fastener.

11. The gas turbine engine of claim 1, wherein the at least one voltage discharge channeling assembly includes a metallic threaded insert surrounding the at least one fastener and inserted in the composite case, the metallic threaded insert conductively connecting the conductive path to the at least one fastener.

12. The gas turbine engine of claim 1, further comprising a nut connected to the at least one fastener and conductively connecting the at least one fastener to the conductive case.

13. A method of assembling an engine casing in a gas turbine engine, the method comprising:
    inserting a portion of a voltage discharge channeling assembly into a composite case of the engine casing, the composite case having a conductive path therein, the portion of the voltage discharge channeling assembly conductively connected to conductive path;
    fastening the composite case to a conductive case of the engine case with at least one fastener in such a way that the at least one fastener is not directly conductively connected to the conductive path; and
    forming a discharge path from the conductive path to the conductive case by conductively connecting another portion of the voltage discharge channeling assembly to the at least one fastener.

14. The method of claim 13, wherein inserting the portion of the voltage discharge channeling assembly into the composite case comprises inserting a swaged rivet into the composite case, and
    conductively connecting the other portion of the voltage discharge channeling assembly to the at least one fastener comprises connecting a rivet head of the swaged rivet to a plate and connecting the plate to the at least one fastener.

15. The method of claim 13, wherein inserting the portion of the voltage discharge channeling assembly into the composite case comprises inserting a spike end of a spiked washer into the composite case, and
    conductively connecting the other end of the voltage discharge channeling assembly to the at least one fastener comprises snuggly inserting the at least one fastener in a central bore of the spiked washer.

16. The method of claim 13, further comprising machining a hole into the composite case to access the conductive path, and wherein inserting the portion of the voltage discharge channeling assembly comprises inserting the portion in the hole.

* * * * *